United States Patent [19]

Neuffer et al.

[11] Patent Number: 4,723,078
[45] Date of Patent: Feb. 2, 1988

[54] ARRANGEMENT FOR THE AUTOMATIC ENGAGEMENT OF A HAZARD WARNING SYSTEM

[75] Inventors: Klaus Neuffer, Boeblingen; Egon Frey, Starzach, both of Fed. Rep. of Germany

[73] Assignee: Daimler-Benz Aktiengesellschaft, Stuttgart, Fed. Rep. of Germany

[21] Appl. No.: 49,826

[22] Filed: May 15, 1987

[30] Foreign Application Priority Data

May 17, 1986 [DE] Fed. Rep. of Germany ....... 3616826

[51] Int. Cl.$^4$ ............................................. B60Q 1/44
[52] U.S. Cl. ........................... 307/10 R; 307/10 LS; 307/9; 340/52 R; 340/66; 180/282
[58] Field of Search .............. 307/10 R, 9, 10 LS; 340/52 B, 52 R, 52 H, 61, 67, 69, 71, 72, 74, 76, 81 R, 81 F, 84; 315/79; 180/282, 275, 282, 281, 271; 200/61.45 R, 61.52

[56] References Cited

U.S. PATENT DOCUMENTS

| 3,762,495 | 10/1973 | Usui et al. | 180/282 X |
| 3,846,749 | 11/1974 | Curry | 340/72 |
| 3,909,780 | 9/1975 | Huffman | 180/282 X |
| 4,176,340 | 11/1979 | Steinmeier | 180/282 X |
| 4,384,269 | 5/1983 | Carlson | 340/67 |
| 4,403,210 | 9/1983 | Sullivan | 340/67 X |
| 4,470,036 | 9/1984 | Doerr et al. | 307/10 LS X |
| 4,594,574 | 6/1986 | Thurman | 340/66 X |
| 4,641,041 | 2/1987 | Mattes et al. | 307/10 R |

FOREIGN PATENT DOCUMENTS

| 2218668 | 10/1973 | Fed. Rep. of Germany . |
| 2706962 | 8/1978 | Fed. Rep. of Germany . |
| 2937040 | 4/1981 | Fed. Rep. of Germany . |
| 3208115 | 10/1983 | Fed. Rep. of Germany . |
| 8522428 | 12/1985 | Fed. Rep. of Germany . |
| WO85/04626 | 10/1985 | PCT Int'l Appl. . |

Primary Examiner—William M. Shoop, Jr.
Assistant Examiner—Paul Ip
Attorney, Agent, or Firm—Barnes & Thornburg

[57] ABSTRACT

A circuit arrangement for the automatic engagement of a motor vehicle hazard warning system in case of impact accidents and emergency braking situations which includes an inertia switch with high response threshold and an acceleration sensor connected in parallel thereto with low response threshold whose output signals each serve for engaging the hazard warning system. The output of the acceleration sensor is connected to an evaluation circuit with an integrator and an threshold switch which prevents that also pulse-shaped output signals of the acceleration sensor lead already to turning on the hazard warning system.

12 Claims, 3 Drawing Figures

ARRANGEMENT FOR THE AUTOMATIC ENGAGEMENT OF A HAZARD WARNING SYSTEM

BACKGROUND OF THE INVENTION

The present invention relates to an arrangement for the automatic engagement in case of impact accidents and emergency braking situations of a hazard warning system of a motor vehicle which is adapted to be selectively engaged and disengaged by hand, with an inertia switch that responds at least to impact-like accelerations acting in the road plane of the motor vehicle and then engages the hazard warning system by way of a circuit arrangement with a self-holding circuit while by-passing a manually actuatable hazard warning turn-on switch.

Circuit arrangements are already known in the prior art (DE-PS No. 27 06 962, DE-OS No. 39 37 040) which include an inertia switch whose response threshold is determined by the tilting inertia assisted by magnetic action of a conically truncated body against accelerations acting in the road plane of the vehicle. After overcoming this tilting inertia, an electric switch is closed with an inclined positioning of the body, which activates directly a circuit arrangement with a self-holding circuit which, in its turn, engages the hazard warning system of the vehicle.

As this arrangement is intended to automatically engage the hazard warning system, in addition to situations involving collisions with obstacles (other vehicles, guide rails, etc.), also in case of emergency braking situations, the tilting inertia of the body has to be selected relatively low in order that also not-impact-like-starting (brake) decelerations are able to deflect the body out of its rest position.

However, this leads to the fact that also a short, vehement actuation of the brakes or impacts as are exerted on the vehicle by road surface unevennesses such as pot holes and curbstone edges, when rolling over the same, may lead to the immediate but unintentional engagement of the hazard warning system so that the vehicle driver and surrounding traffic participants would be unnecessarily irritated.

The DE-OS No. 22 18 668 also discloses an arrangement of the aforementioned type which includes an inertia switch with an inertia mass returnable by spring force whose response threshold is adjustable by changing the spring prestress.

SUMMARY OF THE INVENTION

It is the object of the present invention to so construct an arrangement of the aforementioned type that it automatically engages the hazard warning system without delay in case of impact accidents of high acceleration intensity but at lower value decelerations or accelerations of the vehicle automatically engages the hazard warning system with a time delay and in dependence on the interaction duration thereof and which can again be turned off by hand after each automatic engagement by means of the existing hazard warning switch or by means of the ignition switch.

The underlying problems are solved according to the present invention in that an acceleration-sensitive circuit arrangement which has a lower response threshold and a delaying switching behavior, i.e., produces an engaging signal only when exceeding the response threshold over a longer period of time, is connected in parallel with the inertia switch having a high response threshold, in that both outputs are connected by way of an OR element to the circuit arrangement with self-holding circuit for the activation thereof, in that the manually actuatable hazard warning turn-on switch is mechanically coupled with the change-over or double-throw switch, which is connected in the loop of the self-holding circuit, and in that the change-over or double-throw switch is adapted to be switched without overlap between a voltage supply connected by way of an ignition switch and a voltage supply coming directly from a battery and thereby interrupts the closed self-holding circuit during the switching operation.

By connecting an inertia switch with high response threshold in parallel with an acceleration sensor with low response threshold, at the outset a subdivision of the arrangement's sensor aspects is created which permits to reliably detect accelerations of high intensity (impact accident) and of lower intensity (full-, emergency braking) and to differentiate between the same. The great advantage of the selected arrangement according to the present invention resides in that by connecting in the signal output of the acceleration sensor an integrator and a threshold switch, pulse-like signals of the acceleration sensor are filtered out with small turn-off or discharge time constant of the integrator whereas a signal of the acceleration sensor of longer duration, for example, in case of an emergncy braking or during skidding, permits the output signal of the integrator to increase to such an extent that finally the threshold switch is energized and the hazard warning system is turned on.

The DE-OS No. 32 08 115 discloses already an arrangement which, inter alia, automatically engages the hazard warning system of a motor vehicle and includes two different inertia switches. One of the inertia switches thereby serves only for the detection of decelerations in the driving operation whereas the other inertia switch serves only for the detection of vibrations of the turned-off vehicle.

An RC filter is connected in the output of the latter inertia switch which, however, must not effect any signal delay when functioning according to the assigned task. Additionally, an arrangement for engaging the brake lights of a motor vehicle also during decelerations only by engine braking is disclosed from the WO-A1 No. 85/04626 in which a signal delay element is connected in the output of a vacuum-actuated sensor switch which suppresses the lighting up of the brake lights with every brief drive pedal release, for example, when changing the transmission speed.

By reason of an OR connection of the outputs of the inertia and of the threshold switch, a response of one of the two switches leads to the automatic activation of the hazard warning system of the motor vehicle.

With high-powered motor vehicles which reach high starting accelerations, it may be necessary according to a further feature of the present invention to connect the output signal of the acceleration sensor ahead of or after the integrator with a brake signal by way of an AND element in order thus to prevent an automatic engagement of the hazard warning system during full accelerations.

Another advantageous modification of the arrangement according to the present invention provides an additional contact in the acceleration-sensitive circuit arrangement which responds during a rotation of the motor vehicle through 180° about its longitudinal or transverse axis and also activates the hazard warning system when, for example, the vehicle gets off the road, turns over and comes to rest lying on the roof. In particular during darkness a correspondingly equipped vehicle which lies off the road as a result of an accident, produces a noticeable emergency signal.

Of course, the inertia switch with high response threshold could also be combined with a roof position contact which responds more rapidly to accelerations not acting in the road plane.

The roof position contact is preferably provided in case of a connection of the output signal of the acceleration sensor, respectively, of the acceleration-sensitive circuit arrangement with the brake signal by way of an AND element but should be integrated of course into the acceleration sensor when this connection is not provided.

BRIEF DESCRIPTION OF THE DRAWINGS

These and other objects, features and advantages of the present invention will become more apparent from the following description when taken in connection with the accompanying drawing which shows, for purposes of illustration only, several embodiments in accordance with the present invention, and wherein.

DETAILED DESCRIPTION OF THE DRAWINGS

Figure 1:
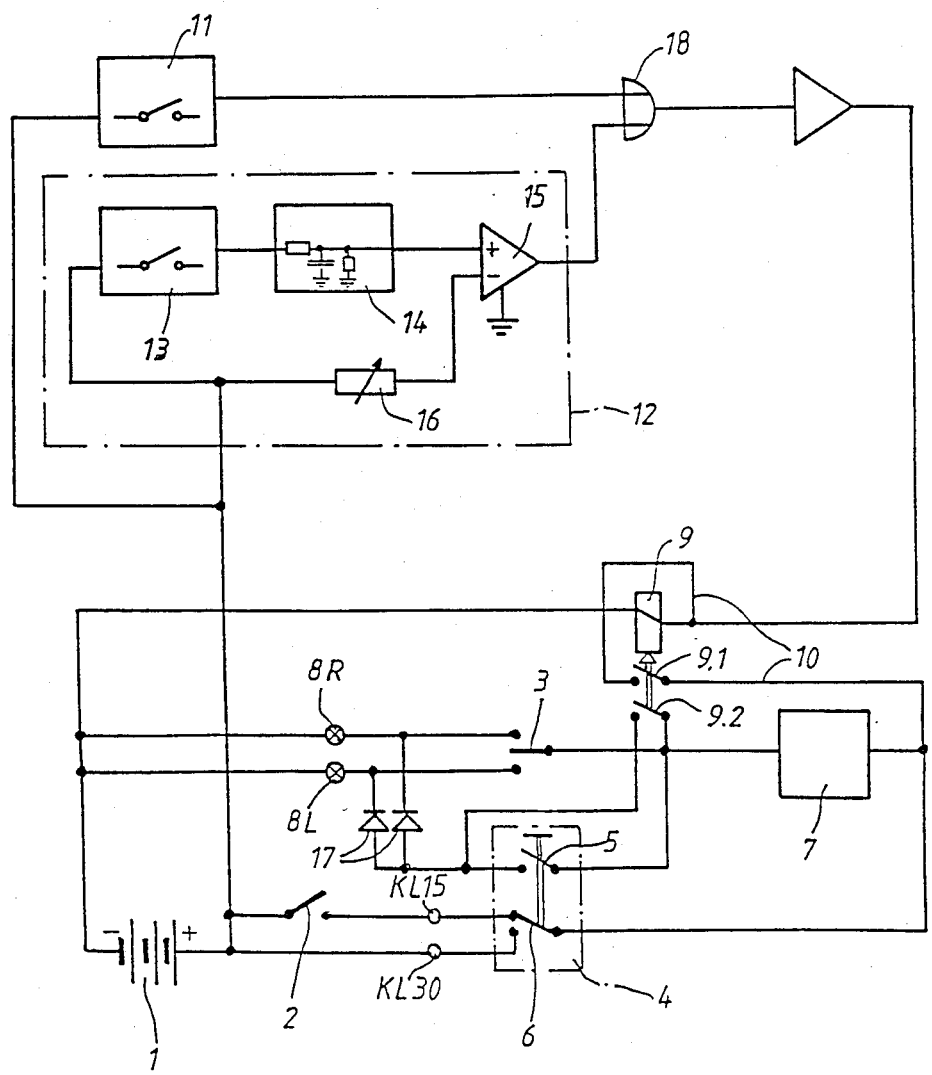
FIG. 1 is a complete schematic diagram of a circuit arrangement in accordance with the present invention.

Referring now to the drawing wherein like reference numerals are used throughout the various views to designate like parts and more particularly to FIG. 1, a battery 1 is provided as on-board voltage source of the vehicle. The plus potential is supplied from the battery 1 to a terminal Kl 30, to an inertia switch 11, to an acceleration-sensitive circuit arrangement 12 and to an ignition switch 2. With a closed ignition switch 2, plus potential also exists at a terminal Kl 15.

A manually actuatable hazard warning switch 4 includes a turn-on switch 5 and a double-throw switch 6 which are mechanically coupled and are actuated in unison. One contact of the double-throw switch 6 is connected to the terminal Kl 15 while another contact is connected to the terminal Kl 30. The movable contact member of the double-throw switch 6 is adapted to be switched to and fro between these two connections whereby with an open turn-on switch 5, i.e., with the hazard warning system off, the movable contact member of the double-throw switch 6 is connected to the terminal Kl 15 whereas with a closed switch 5, it is connected to the terminal Kl 30. A line leads from the fixed contact of the double-throw switch 6 to a conventional flasher unit 7 while a branch of this line leads to a first switch 9.1 of a relay 9.

A line leads from the output of the flasher unit 7 to a turn indicator switch 3. This line includes branches to a second switch 9.2 of the relay 9 and to the turn-on switch 5 of the hazard warning switch 4. The two switches 9.2 and 5 are connected electrically in parallel and connect each by way of diodes, turn indicator lights 8R and 8L with the flasher unit 7. For simplification of the schematic diagram, only one flashing or turn indicator light is illustrated per vehicle side, 8R for the right side and 8L for the left side whereby, of course, further flashing and control lights can be connected in parallel with the same.

The turn indicator switch 3 connects selectively the turn indicator light 8R or 8L with the flasher unit 7 when manually deflected from its center position.

The diodes 17 are also connected in the loop only for purposes of simplification of the schematic diagram. In order to avoid an unnecessary voltage drop ahead of the turn indicator lights, two parallel switching contacts will be provided in the switches 9.2 and 5 which each have a common input connection but lead by way of separator output connections to the turn indicator lights 8R and 8L so that these lights can be turned on in unison for the emergency flashing but are electrically separated when switches 9.2 and 5 are open and cannot light up simultaneously with an intended turn indication flashing.

A self-holding circuit 10 for the relay 9 is closed by way of the ignition switch 2, the double-throw switch 6 of the hazard warning switch 4 and the switch 9.1 as soon as the relay 9 is energized by the inertia switch 11 or the acceleration-sensitive circuit arrangement 12.

The circuit arrangement 12 consists at least of one acceleration sensor with a low response threshold (about 0.5 to 0.8 g), of an integrating circuit 14 and of a threshold switch 15 which are connected in series. An adjustable resistance 16 makes it possible to adjust the reference value of the threshold switch 15 to the integral value necessary for energization and therewith to the required response duration of the acceleration sensor 13. The inertia switch 11 is designed for a high response threshold (about 4 g). The circuit arrangement 12 is operatively and electrically connected in parallel with the inertia switch 11 in that the output of the inertia switch 11 and the output of the threshold switch 15 are connected to the two inputs of an OR element 18. The output signals thereof is connected, if necessary after amplification, to the relay 9.

OPERATION

The operation of the arrangement illustrated in the circuit diagram of FIG. 1 is as follows.

With a closed ignition switch 2 and with a hazard warning switch 4 in the position shown in the drawing, plus potential is present at the flasher unit 7, at the switch 9.1 of the relay 9 as well as directly from the battery 1 at the inertia switch 11 and at the circuit arrangement 12. The vehicle driver may, as usual, manually actuate both the turn indicator switch 3 as also the hazard warning switch 4 whereby in the former case a turn indication takes place and in the second case a warning or emergency flashing of all turn indicator lights 8R, 8L. Both operations can be turned off manually by a corresponding switch actuation so that the switches 3 and 4 assume again the illustrated position.

If an acceleration or a deceleration now acts on the vehicle whose component in the road plane exceeds a value of 4 g, then the inertia switch 11 closes and activates by way of the OR element 18 the relay 9 so that both switches 9.1 and 9.2 are brought into the non-illustrated closing position.

The self-holding circuit 10 is now closed from the battery plus terminal by way of the ignition switch 2, terminal Kl 15, double-throw switch 6, switch 9.1 and the relay winding 9 to the negative terminal of the battery. The switch 9.2 of the relay 9 at the same time bridges or bypasses the hazard warning turn-on switch 5 so that both turn indicator lights 8R and 8L receive voltage pulses for producing a warning flashing signal from the flasher unit 7 by way of the switch 9.2 and the diodes 17.

Road unevennesses do not cause such high acceleration values to act on the vehicle so that the inertia switch 11 does not respond to the same. The more sensitive acceleration sensor 13, however, will already respond in that case and will apply an output signal to the integrating circuit 14. The integrating circuit 14 may consist advantageously of an RC element whose charging time constant is greater than its discharge or turn-off time. Pulse-like existing output signals of the acceleration sensor 13 which exist, for example, when rolling over road unevennesses, will therefore not suffice for charging the integrating circuit 14 to effect a conduction of the threshold switch 15 because the condenser is discharged again rapidly by way of the relatively small discharge resistance.

If, in contrast, the vehicle is braked hard in an emergency situation, then the acceleration sensor 13 applies a continuing voltage signal to the integrating circuit 14. The latter then charges up to such an extent that finally the reference value of the threshold switch 15 is reached and the latter becomes conductive. The relay 9 is now controlled by way of the OR element 18 in a similar manner as during closing of the inertia switch 11 and passes over into self-holding and turns on the hazard warning system.

For turning off the hazard warning system engaged by way of the relay switch 9.2, the self-holding circuit 10 can be interrupted either by opening of the ignition switch 2 or by switching the double-throw switch 6 in the emergency or hazard warning switch 4 into the non-illustrated position. In the latter case, the movable contact of the double-throw switch 6 becomes free of any voltage for a short period of time during the switch-over operation, for it switches without overlap from the terminal Kl 15 to the terminal Kl 30. Admittedly, as a result thereof, the emergency warning system is now manually turned on at the same time because the double-throw switch 6 can be actuated only in unison with the emergency turn-on switch 5. However, by a renewed actuation of the turned-on, detented emergency warning flasher switch 4, the emergency warning system is then finally turned off.

Figure 2:
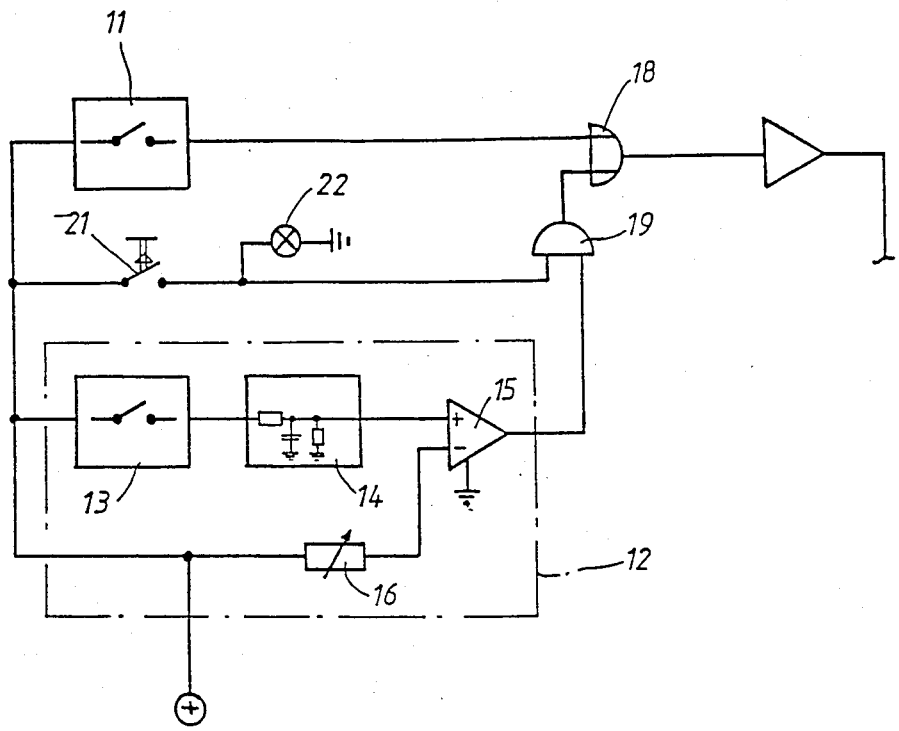
FIG. 2 is a partial circuit arrangement of a modified embodiment of the circuit arrangement of FIG. 1 with a connection of an acceleration signal with a brake signal.

In FIG. 2, a brake signal generator 21 and a brake light 22 are additionally shown in a part of the circuit diagram according to FIG. 1. An output signal of the brake signal generator 21 and the output signal of the threshold switch 15 are logically linked in an AND element 19 whose output is connected to an input of the OR element 18 in parallel with the inertia switch 11.

A brake signal from the brake signal generator 21 and an output signal of the threshold switch 15 must be present at the same time at the AND element 19 in order that the hazard warning system is automatically engaged with a continuing response of the acceleration sensor 13. With full acceleration of a high-powered vehicle, the emergency warning system is not automatically turned on notwithstanding possible response of the acceleration sensor 13.

Figure 3:
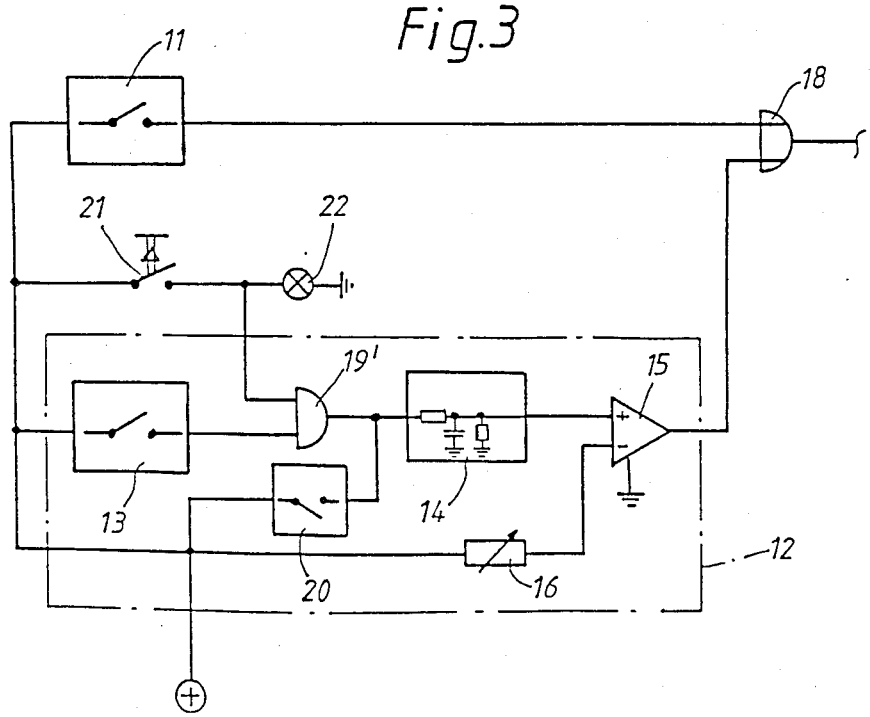
FIG. 3 is a partial schematic circuit diagram of a still further modified embodiment of the circuit arrangement of FIG. 1 with a connection of an acceleration signal with a brake signal and an additional roof position contact in accordance with the present invention.

FIG. 3 also shows a part of the schematic diagram according to FIG. 1 whereby an output of the brake signal generator 21 and the output of the acceleration sensor 13 are now combined at an AND element 19′ ahead of the integrating circuit 14. Additionally, a roof position contact 20 is provided which is supplied with plus potential and whose signal output is connected to the input of the integrating circuit 14.

This arrangement brings about that an input signal from the output of the AND element 19′ is supplied to the integrating circuit 14 only when output signals of the acceleration sensor 13 and of the brake signal generator 21 are present at the same time at the inputs of the AND element 19. However, the emergency signal of the hazard warning system is also automatically turned on by closing the roof position contact 20 after the vehicle equipped with the arrangement indicated schematically in FIG. 3 has rolled over and subsequently landed on its roof, even if the inertia switch 11 has not responded and the acceleration sensor 13 has responded only for a brief period of time.

The inertia switch 11 and the accelerator sensor 13 are designated differently herein; however, in principle they may be of identical construction when the respective response threshold of 4, respectively, 0.5 to 0.8 g is adjustable in the actual realization. Such acceleration switches are known as such so that a detailed description of their construction is dispensed with herein. The indicated response threshold values of 4, respectively 0.5 to 0.8 g are merely intended as guide values.

Above all with the low response threshold of the acceleration sensor 13, a sufficient spacing to a possible response, for example, when driving over very steep mountain roads and simultaneous braking must, of course, be maintained. The lower threshold value of 0.5 g would deflect a thread pendulum through about 26.5° from the vertical if the suspension point thereof were to be accelerated horizontally with the indicated value. This pendulum deflection would also result when driving over a 50% ramp—a range which is not too remote with cross-country vehicles.

The relay 9 may, of course, be replaced by an electronic circuit of similar function; the illustration in the schematic diagram merely serves the purpose of simplification and ease of understanding.

While we have shown and described several embodiments in accordance with the present invention, it is understood that the same is not limited thereto but is susceptible of numerous changes and modifications as known to those skilled in the art, and we therefore do not wish to be limited to the details shown and described herein but intend to cover all such changes and modifications as are encompassed by the scope of the appended claims.

We claim:

1. An arrangement for automatically engaging a hazard warning system of a motor vehicle which is operable to be selectively turned on and off by hand, in case of impact accidents and emergency braking situations, comprising inertia switch means which responds at least to impact-like accelerations acting in the road plane of the motor vehicle, a manually actuatable hazard-warning switch means including a turn-on switch for manually turning on the hazard-warning system, circuit means including a self-holding circuit operatively connecting the inertia switch means with the hazard-warning system for turning on the latter while bridging the manually actuatable hazard warning switch means, the hazard-warning switch means including further a change-over switch which, when manually actuated, turns off the hazard-warning system after its automatic engagement effected by the inertia switch means, by interruption of the self-holding circuit, an acceleration-sensitive circuit means which has a relatively lower response threshold and a delaying switching behavior, said acceleration-sensitive circuit means being operatively connected in parallel with the inertia switch means with relatively higher response threshold, the output of said inertia switch means and of said acceleration-sensitive circuit means being connected by way of an OR element with the circuit means including the self-holding circuit for the activation thereof, the manually actuatable hazard-warning turn-on switch being mechanically coupled with the change-over switch which is operatively connected in a loop including the self-holding circuit, and the change-over switch being operable to be switched without overlap between a voltage supply connected by way of an ignition switch and a voltage supply coming directly from a battery and thereby interrupting the closed self-holding circuit during such change-over switching.

2. An arrangement according to claim 1, wherein the acceleration-sensitive circuit means produces a turn-on signal only when exceeding the response threshold over a longer period of time.

3. An arrangement according to claim 2, wherein the acceleration-sensitive circuit means includes a series circuit having an acceleration sensor with a relatively low response threshold, an integrating circuit and a threshold switch means.

4. An arrangement according to claim 3, wherein the integrating circuit consists of an RC element whose discharge time constant is smaller than its charging time constant.

5. An arrangement according to claim 3, wherein the acceleration sensor responds beginning with spatial acceleration of the vehicle between about 0.5 and 0.8 times the acceleration due to gravity and applies an output signal to the integrating circuit.

6. An arrangement according to claim 2, wherein the response threshold of the inertia switch means to accelerations in the driving plane of the vehicle amounts to about four times the acceleration due to gravity.

7. An arrangement according to claim 2, wherein the output of the acceleration-sensitive circuit means is connected ahead of the OR element with an output of a brake signal generator means by way of an AND element.

8. An arrangement according to claim 3, wherein the output of the acceleration sensor is linked by way of an AND element with an output of a brake signal generator means.

9. An arrangement according to claim 2, wherein the acceleration-sensitive circuit means further comprises a roof position contact which after a rotation of the vehicle through 180° about the longitudinal or transverse axis, activates the circuit means with the self-holding circuit.

10. An arrangement according to claim 5, wherein the response threshold of the inertia switch means to accelerations in the driving plane of the vehicle amounts to about four times the acceleration due to gravity.

11. An arrangement according to claim 9, wherein the output of the acceleration-sensitive circuit means is connected ahead of the OR element with an output of a brake signal generator means by way of an AND element.

12. An arrangement according to claim 9, wherein the output of the acceleration sensor is linked by way of an AND element with an output of a brake signal generator means.

* * * * *